T. E. MURRAY, Jr. & J. B. MURRAY.
PROCESS OF AND APPARATUS FOR WELDING METAL BODIES AND FOR ANNEALING SAID BODIES
AT THE WELDED JOINT.
APPLICATION FILED APR. 24, 1917.
1,252,144. Patented Jan. 1, 1918.
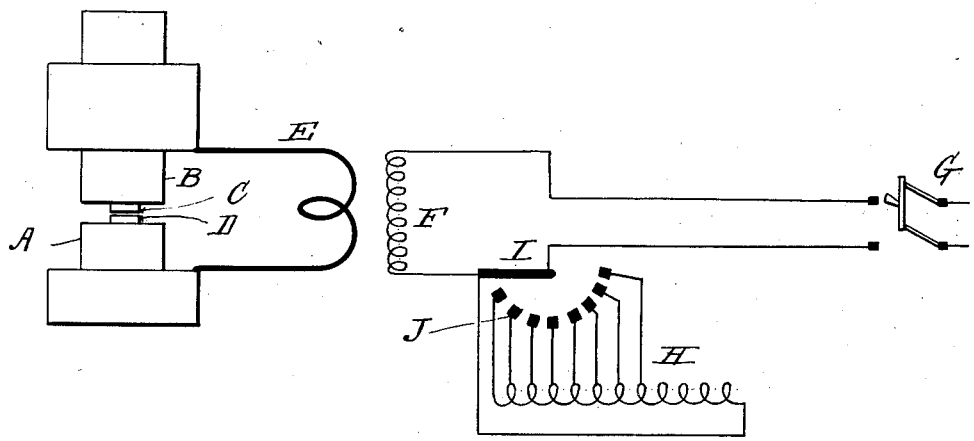
Inventors
Thomas E. Murray Jr
Joseph B. Murray
By Their Attorney

UNITED STATES PATENT OFFICE.

THOMAS E. MURRAY, JR., AND JOSEPH B. MURRAY, OF BROOKLYN, NEW YORK.

PROCESS OF AND APPARATUS FOR WELDING METAL BODIES AND FOR ANNEALING SAID BODIES AT THE WELDED JOINT.

1,252,144.  Specification of Letters Patent.  Patented Jan. 1, 1918.

Application filed April 24, 1917. Serial No. 164,133.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Processes of and Apparatus for Welding Metal Bodies and for Annealing Said Bodies at the Welded Joint, of which the following is a specification.

The invention is a process of welding and annealing metal bodies, the product thereof, and an apparatus whereby said process may be carried into effect.

In the operation of electric welding, the metal at the joint becomes highly heated and fused or molecularly dissociated, so that an apparent intermingling of the molecules of the two bodies while under pressure results. The consequence is that the character of the metal at the joint becomes modified, and is different from that of the bodies elsewhere, especially in point of hardness. The object of our invention is to maintain the metal at the joint at its original homogeneity with the unmodified metal of said bodies, so that after the welding the said bodies shall be in substantially their original state throughout. We have accomplished this by subjecting the said bodies after welding and while still hot and in place between the welding electrodes to a heating current whereby the cooling of the metal is retarded.

The accompanying drawing is an electrical diagram of an apparatus for carrying into effect the aforesaid preferred process. A is a fixed electrode, B is a vertically movable electrode, and C and D are the bodies to be welded secured upon said electrodes in any suitable way. The electrodes A, B are respectively connected to the terminals of the transformer secondary E. The terminals of the primary F of said transformer are connected to a source of alternating current, and are in circuit with the switch G. In said primary circuit is also a variable reactance H and switch lever I coöperating therewith, so that the strength of the current in the primary may be varied at will.

After the bodies C, D are placed in welding position and the switch lever I is closed, as shown in the drawing, and the switch G is also closed, the welding current is delivered to said objects to produce the welded joint between them. The current may then be interrupted at switch G, and the switch I is adjusted to close circuit with a selected one of the contacts J of the variable reactance. In this way, after the switch I is again closed the current delivered to the bodies is reduced in strength and by suitable choice of said contact to such extent as that it will cause said bodies while still hot and between the welding electrodes to cool slowly, and so become annealed.

We claim:

1. The process of electrical welding and annealing which consists in first, electrically welding the bodies together and then while said bodies are still heated, subjecting them to a current of reduced strength to cause said bodies to cool slowly.

2. An apparatus for electrical welding and annealing comprising welding electrodes, means for delivering a welding current to said electrodes, and means for reducing the strength of said current in the circuit including said electrodes to retard the cooling of the metal at the welded joint.

3. An apparatus for electrical welding and for annealing the welded joint, comprising a transformer, welding electrodes in the secondary circuit thereof, and a variable reactance in the primary circuit of said transformer, whereby after the welded joint is formed and the metal thereof is still hot, a current of reduced strength may be delivered to said metal to retard the cooling thereof.

In testimony whereof we have affixed our signatures in presence of two witnesses.

THOMAS E. MURRAY JR.
JOSEPH B. MURRAY.

Witnesses:
GERTRUDE T. PORTER,
MAY T. McGARRY.